United States Patent
Kumar et al.

(10) Patent No.: US 9,367,305 B1
(45) Date of Patent: Jun. 14, 2016

(54) AUTOMATIC CONTAINER DEFINITION

(71) Applicant: Runnable Inc., San Francisco, CA (US)

(72) Inventors: Yash Kumar, San Francisco, CA (US); Tejesh Mehta, Fremont, CA (US); Sundip Patel, San Francisco, CA (US); Praful Rana, San Francisco, CA (US); Casey Flynn, San Francisco, CA (US); Nathan Allen Meyers, San Francisco, CA (US); Tony Li, Daly City, CA (US)

(73) Assignee: Runnable Inc., San Francisco, CA (US)

( * ) Notice: Subject to any disclaimer, the term of this patent is extended or adjusted under 35 U.S.C. 154(b) by 0 days.

(21) Appl. No.: 14/793,527

(22) Filed: Jul. 7, 2015

Related U.S. Application Data

(63) Continuation of application No. 14/722,364, filed on May 27, 2015.

(51) Int. Cl.
*G06F 9/44* (2006.01)

(52) U.S. Cl.
CPC ........................................ *G06F 8/71* (2013.01)

(58) Field of Classification Search
CPC .......... G06F 8/71; G06F 9/44505; G06F 8/20
USPC ........................................................ 717/121
See application file for complete search history.

(56) References Cited

U.S. PATENT DOCUMENTS

| | | | |
|---|---|---|---|
| 8,341,648 B1 | 12/2012 | Cook | |
| 8,347,263 B1 | 1/2013 | Offer | |
| 8,438,495 B1 * | 5/2013 | Gilra | G06F 3/0481 345/173 |
| 8,713,566 B2 | 4/2014 | Kashyap et al. | |
| 2002/0108101 A1 | 8/2002 | Charisius et al. | |
| 2003/0145041 A1 | 7/2003 | Dunham et al. | |
| 2007/0094378 A1 | 4/2007 | Baldwin et al. | |
| 2009/0125546 A1 | 5/2009 | Iborra et al. | |
| 2009/0254877 A1 | 10/2009 | Kuriakose et al. | |
| 2011/0119660 A1 | 5/2011 | Tanaka | |
| 2011/0184716 A1 | 7/2011 | Mangold et al. | |
| 2011/0302110 A1 * | 12/2011 | Beers | G06F 17/30554 706/11 |
| 2012/0054716 A1 * | 3/2012 | Tailliez | G06F 8/61 717/107 |
| 2012/0066296 A1 | 3/2012 | Appleton et al. | |
| 2013/0104137 A1 | 4/2013 | Fukuzaki et al. | |
| 2015/0302220 A1 * | 10/2015 | Cismas | H04L 63/0876 707/783 |

OTHER PUBLICATIONS

Turnbull, James, "", The Docker Book, © Copyright 2014 JamesTurnbull, (2015), 67 pgs.
U.S. Appl. No. 14/793,496, Examiner Interview Summary mailed Dec. 17, 2015, 3 pgs.

(Continued)

*Primary Examiner* — John Chavis
(74) *Attorney, Agent, or Firm* — Schwegman Lundberg & Woessner, P.A.

(57) ABSTRACT

A container configuration system is provided. The container configuration system includes at least one processor and a memory. The at least one processor is configured to receive a source application, the source application including a source element, determine a dependency component from the source element, generate a container configuration including at least the dependency component, and provide the container configuration for execution in an execution environment enabled to execute containers.

20 Claims, 9 Drawing Sheets

(56) References Cited

OTHER PUBLICATIONS

U.S. Appl. No. 14/793,496, Non Final Office Action mailed Sep. 17, 2015, 12 pgs.

U.S. Appl. No. 14/793,496, Response filed Dec. 17, 2015 to Non Final Office Action mailed Sep. 17, 2015, 14 pgs.

* cited by examiner

AUTOMATIC CONTAINER DEFINITION

RELATED APPLICATIONS

The present application is a continuation of U.S. patent application Ser. No. 14/722,364, filed May 27, 2015, which is incorporated herein by reference in its entirety.

TECHNICAL FIELD

This application relates to software development and, in some embodiments, to a method and system to automatically generate containers for a source application.

BACKGROUND

In the field of software development and deployment, software "containers" provide a layer of abstraction and virtualization for a running application. For example, some Linux kernels support "namespaces", which at least partially isolates an application's view of the underlying operating system (e.g., processes, users, and filesystems), as well as "cgroups" (control groups, or "process containers"), which isolates resource usage (e.g., cpu, memory) for a group of processes. DOCKER® is an open-source project that provides tools for packaging an application and associated components such as to facilitate portability between various execution environments such as, for example, cloud environments such as "Container as a Service", or "Caas", environments, physical server environments (e.g., traditional "bare metal" servers), and virtual server environments. (Docker, Inc., a Delaware Corporation). Docker offers one example of a container for software applications (a "container application") that leverages underlying operating system functionality (e.g., Linux namespaces and cgroups) to provide an isolated or restricted operating environment for applications.

It would be helpful to have a system and method for automatically generating containers or container definitions for a particular application and its associated components.

BRIEF DESCRIPTION OF DRAWINGS

Embodiments are illustrated by way of example and not limitation in the figures of the accompanying drawings, in which like reference numbers indicate similar elements and in which.

DETAILED DESCRIPTION

Figure 1:
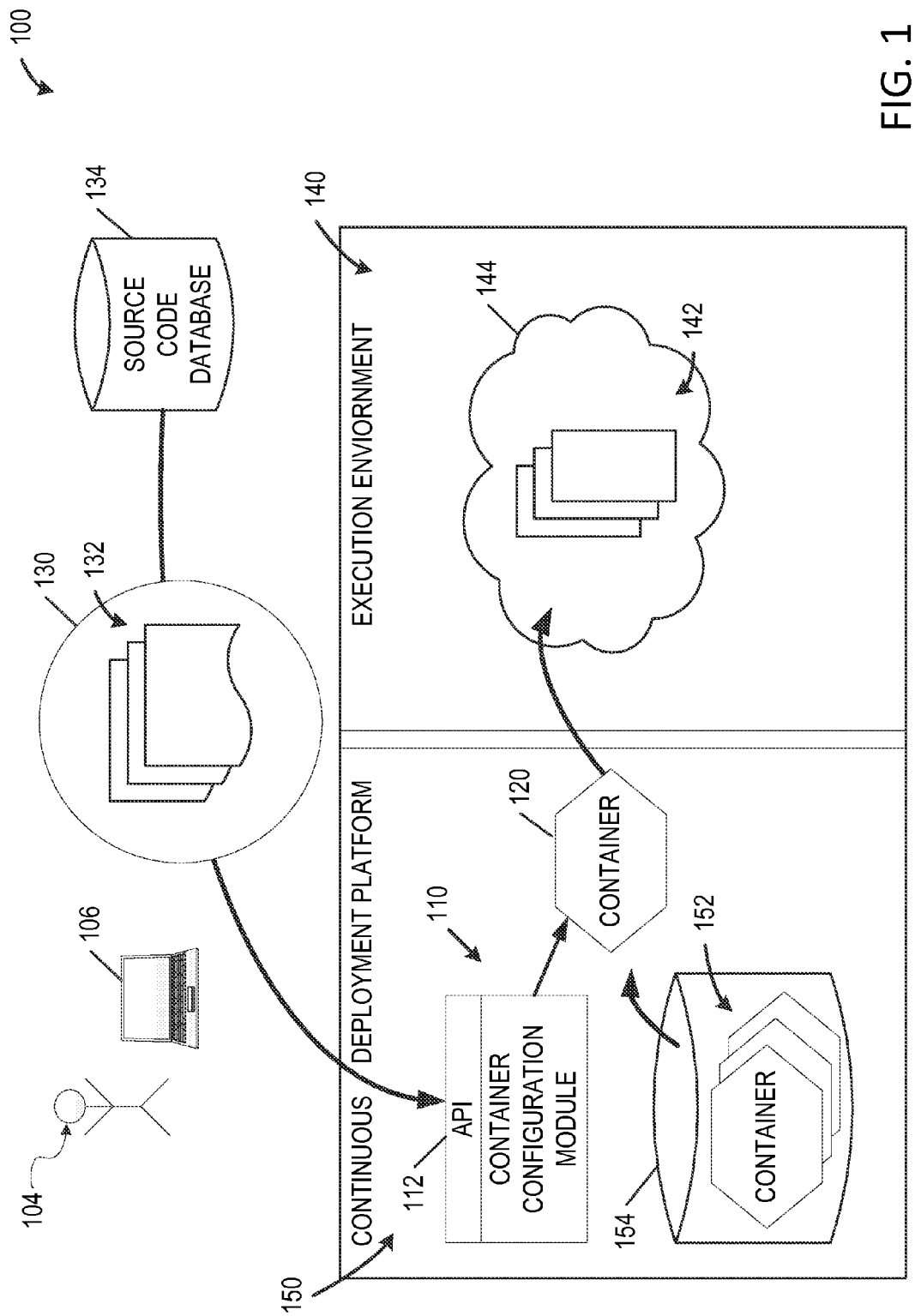
FIG. 1 is a diagram of an example networked environment in which a container configuration module automatically creates one or more containers for a source application.

A system and method for automatically generating containers is described herein. A container configuration module is described herein. The container configuration module generates "container configurations" for a "source application" and, more specifically, from the components of the source application (referred to herein as "source elements"). In some example embodiments, the container configurations generated by the container configuration module are container configuration files such as, for example, "dockerfiles", and/or container images such as, for example, DOCKER® "images". In many of the example embodiments described herein, containers are described in the context of DOCKER®, and in the context of Linux, the operating system. However, containers may be supported by other container applications and by other operating systems.

In the systems and methods described herein, an application developer (referred to herein simply as a "user") provides the source application to the container configuration module. The source application includes one or more "source elements" such as, for example, source code files, application configuration files, environment configuration files, documentation files, binaries, and/or custom libraries. The container configuration module inspects these source elements to determine additional dependent components (e.g., other application components that were not provided as a part of the source application, such as components required to properly execute the source application). For example, the container configuration module may determine, from inspecting a source code file (a source element), that the source application requires a particular compiler or framework application (e.g., a dependency component not already included in the source elements). As such, the container configuration module includes the dependency component in the container configuration.

Accordingly, after identifying one or more dependency components, the container configuration module builds a container configuration for the source application (e.g., a DOCKER® image and/or a dockerfile that may be used to build one or more DOCKER® images). In some embodiments, the container configuration module builds one or more dockerfiles for the source application. The container configuration may include or reference, for example, one or more of the source elements provided by the user, container configuration file(s) (e.g., the constructed dockerfile), and one or more images (e.g., DOCKER® images).

A system and method for automatically generating a relational communications graph for a source application are also described herein. A communications mapping module generates the relational communications graph for the source application that includes multiple application components, or "sub-applications". More specifically, the communications mapping module inspects source elements associated with the source application and sub-applications to determine communications dependencies between the components of the source application. The relational communications graph includes the application sub-components and the determined communications dependencies linking these sub-components.

The term "container", as is commonly used in the field, refers to a computing environment which, during execution, at least partially isolates an application's view of an underlying operating system and/or resources. As used herein, the term "container" may be used to refer to either the running environment (e.g., during execution), or to the data structures or configurations that are used to define or build the running environment (e.g., as static data apart from execution). The term "container configuration" is used to refer to the container data structures or configurations that are used to build a container (e.g., during execution). For example, a dockerfile is an example of a container configuration. The dockerfile contains instructions that are used to build a container.

A "container image" also defines a container insomuch as, and as is known in the art, a container image may be built from a running container to include components defined by the running container during execution. A container image is static data defining a container and the container's components. In some embodiments, a container image may be built from a running container (e.g., a static image created based on the components loaded and/or executed within the container). In some embodiments, a container image may be built from a container configuration (e.g., from a dockerfile). Because a container image is static data defining a container, a container image is also referred to herein as a container configuration (e.g., one type of a container configuration).

The term "container build", as used herein, refers to the construction of a container during execution. As is known in the art, a container may be built in layers during execution by starting various components in a particular order. A container build may be performed "manually" by, for example, a developer or a systems administrator starting one component at a time within the container, or the container build may be "scripted", or built as defined by a container configuration such as a dockerfile. In other words, a container configuration such as a dockerfile, inter alia, defines the components and order of execution of those components during build (e.g., during "start-up" execution of the container), and thus a container build results in a "running container".

FIG. 1 is a diagram of an example networked environment 100 in which a container configuration module 110 creates one or more container configurations 120 from a source application 130. In the example embodiment, the container configuration module 110 is a part of a continuous deployment platform 150 that enables a user 104, such as an application developer, to create builds of application components (e.g., within one or more container configurations 120) and to deploy those applications into an execution environment 140 (e.g., the server environment hosting the running application).

The execution environment 140 provides container execution services for container configurations 120 through a cluster 144 of computing servers 142 configured to support execution of containers (e.g., running versions of Linux that support containers). The container configuration module 110 may operate independently from the execution environment 140, and container configurations 120 may be provided to the execution environment 140 for processing. In some embodiments, the execution environment 140 is a Container as a Service ("CaaS") system. The execution environment 140 may include a virtual machine ("VM", not shown) or VM infrastructure (e.g., operating as execution environment 140) which is configured to support execution of containers (e.g., a VM running a version of Linux that supports containers).

An application developer (or "user") 104 may develop a source application 130 that includes one or more source elements 132 such as, for example, source code files (e.g., written in a compiled or interpreted language or framework), application configuration files, environment configuration files (e.g., runtime environment variables, scripts for building and/or running the application), documentation files, binaries, and/or custom libraries. These source elements 132 represent the application 130, but may exclude one or more functional components required to execute the application 130. For example, static source hypertext markup language (HTML) may be developed for a commercial web page (e.g., the application 130), but the web server responsible for serving the web page (e.g., an http server) may not be provided as a part of application 130. As such, in order to properly execute the application within a container (e.g., serve the HTML content), an http server may also be required to be provided as a part of the container.

The user 104, in the example embodiment, stores source elements 132 in a source code database 134. For example, the source code database may store source elements 132 in a version control system such as GIT® (Software Freedom Conservancy, Inc., a New York Corporation), APACHE SUBVERSION® (The Apache Software Foundation, a Delaware Corporation), mercurial, or a source control management system as a service, such as GITHUB® (GitHub, Inc., a Delaware corporation). The user 104 and/or the source code database 134 provide the application 130 (e.g., source elements 132) to the container configuration module 110 through an application program interface ("API") 112. In other embodiments, the user 104 may provide source elements 132 directly (e.g., via direct upload, or via storage local to the continuous deployment platform 150).

Further, in some embodiments, database 134 also includes one or more application models for multiple software applications. As used herein, the term "dependency model" is used to refer to a group of metadata that is used to determine software dependencies from source elements of an application, such as source elements 132. In some embodiments, multiple dependency models are provided, each of which is specifically configured for a particular type of source element (e.g., models specific to a particular programming language or framework or application component). For example, a dependency model may be developed for source components in the Ruby programming language, another dependency model for the Python programming language, and another dependency model for Java, and another for C++.

A dependency model may include one or more model elements, or pairs of metadata, that are used to determine component dependencies. Each dependency model element may be represented as a variable pair including a dependency indicator and a dependency component (e.g., (<dependency indicator>, <dependency component>)), where the dependency indicator is used to determine a dependency within the source element 132 for the dependency component. In other words, during operation, the container configuration module 110 may search a source element 132 for the dependency indicator and, if found, the container configuration module 110 may include the dependency component associated with that dependency indicator into the container configuration 120. These dependency indicators may include known strings or libraries that indicate the reliance on, or dependency on, another application component (e.g., the dependency component).

For example, the container configuration module 110 may evaluate a source element 132 (a Ruby source element) written in the Ruby programming language. The container configuration module 110 accesses the "Ruby dependency model," which includes multiple model elements with indicators specific to the Ruby programming language. The container configuration module 110 searches the Ruby source element 132 for each of the dependency indicators. For each dependency indicator identified within the Ruby source element, the container configuration module 110 adds the dependency component associated with the dependency indicator to the container configuration 120. Additional details and embodiments are described below in respect to FIG. 3.

The continuous development platform 150 also includes multiple containers, container images, and/or container configurations 152 within a container repository 154 maintained by the continuous development platform 150. Container configurations 152 may include one or more "base images", such as images for one or more operating systems (e.g., particular builds of UBUNTU® (Canonical Ltd., an Isle of Man Company) or FEDORA® (Red Hat Inc., a Delaware Corporation)). Container configurations 152 may also include pre-built containers or container images for commonly used application packages such as, for example, HADOOP® (The Apache Software Foundation, a Delaware Corporation), PostgresSQL, Apache Kafka, MYSQL® (MySQL AB A Company, of Sweden), Mono, Ruby, RUBY ON RAILS® (David Heinemeier Hansson, individual of Denmark), Java, Apache, JBOSS® (Red Hat, Inc., a Delaware Corporation), etc. In some embodiments, multiple repositories 154 may be available to the container configuration module 110. In some embodiments, repository 154 may be maintained by a third party.

During operation, the container configuration module 110 generates the container configuration 120 for the source application 130 and, more specifically, from the source elements 132 of the application 130. In the example embodiment, the container configuration module 110 inspects each of the source elements 132 for indications of other elements that are needed to execute the application 130. These additional elements are referred to herein as "dependency components" (not separately shown in FIG. 1). In other words, through inspection of the source elements 132, the container configuration module 110 identifies one or more dependency components to include in container configuration 120 that may be used during execution of the container configuration 120. The process of identifying the dependency components by the container configuration module 110 is discussed further below.

Once created, the resultant container (or "target container") 120 includes at least the dependency component(s) (not shown in FIG. 1) for running the application 130. In some embodiments, one or more of the source elements 132 also become target elements. In other words, a set of target elements is added to the target container configuration 120 that includes the dependency component(s) and, in some situations, one or more of the source elements 132. As such, the target container configuration 120 includes application components necessary for the execution environment 140 to run the application 130 within an executing container.

The container configuration module 110 generates a dockerfile for the application 130. In other words, the resultant container configuration 120 includes a dockerfile defining a DOCKER® container. The dockerfile identifies a sequence of container configuration commands that build the container with the dependency components identified by the process. The build of the dockerfile is discussed in greater detail below.

Figure 2:
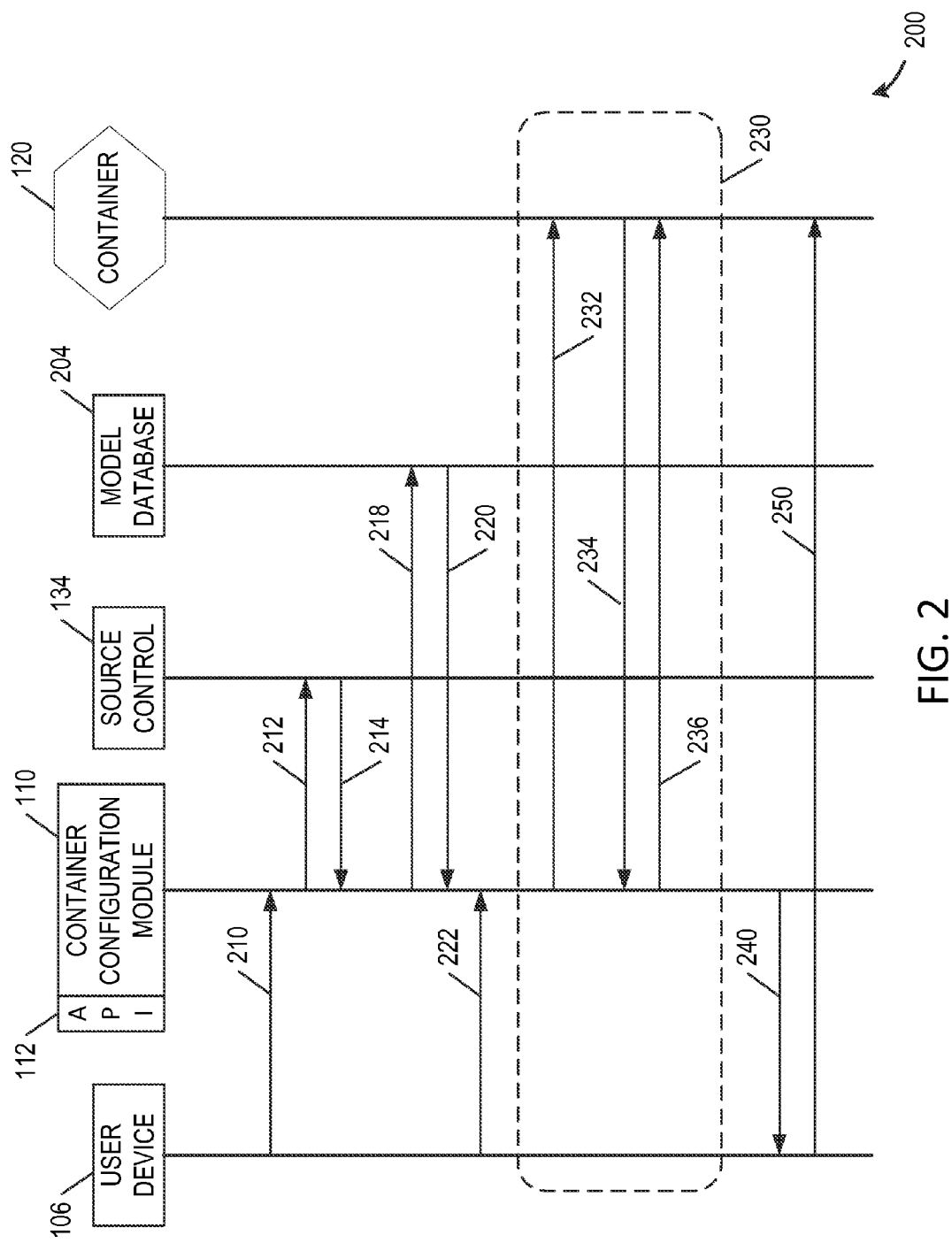
FIG. 2 is a swim lane diagram of an example build sequence in which the container configuration module shown in FIG. 1 creates a container for the source application shown in FIG. 1.

FIG. 2 is a swim lane diagram of an example build sequence 200 in which the container configuration module 110 creates container configuration 120 for an application such as application 130 (shown in FIG. 1). The application 130 includes application source code such as source elements 132 (shown in FIG. 1). Further, operations are performed in numerical order, from the top of FIG. 2 to the bottom, with some possibly being repeated. During operation, user device 106 initiates 210 a container configuration request (e.g., for the application 130) to the container configuration module 110 through API 112. The container configuration module 110 collects 212 the source elements 132 (shown in FIG. 1) for the application 130 from source control system 134, which provides 214 the source elements 132 back to the container configuration module 110. In other embodiments, user 104 and/or user computing device 106 provides some or all of source elements 132.

The container configuration module 110, in the example embodiment, then determines 218 and receives 220 one or more dependency models (not separately shown in FIG. 2, sometimes referred to herein merely as "models") from a model database 204 to be used for creating a container configuration 120 for the source application 130. The dependency models may be identified from multiple dependency models stored in a models database 204, which may be similar to database 154 (shown in FIG. 1). For example, the container configuration module 110 may analyze a particular source element 132 (shown in FIG. 1) and determine that the source element 132 is a Python source code file. As such, the container configuration module 110 may retrieve a Python model from the model database 204. Similarly, the container configuration module 110 retrieves and receives models from the model database 204 for each type of source element 132 included within the source application 130.

Further, the container configuration module 110 also determines 218 and receives 220 a configuration template (not separately shown in FIG. 2) from the model database 204. The configuration template may be selected based on, for example, an overall structure of the source application 130, or the nature of various source elements 132 of the source application 130. In some embodiments, the configuration template is a template dockerfile.

Next, the container configuration module 110 receives 222 environment variables, for example, from the user device 106. The environment variables include information (e.g., parameters) that are relevant for building and/or running the container configurations 120 such as, for example, runtime environment variables associated with the application 130 or specific application elements 132, or configuration files that define such environment variables. For example, the application 130 may define a Transmission Control Protocol (TCP) port that the application 130 uses, for example, for receiving communications from other computing devices. Other examples of environment variables received at operation 222 include URLs, URI, file names, file paths, host names, user names, passwords, security tokens, software/API version numbers, framework names, IP addresses, application runtime specific flags (e.g., DEV, PROD, TEST_MODE), application specific data or metadata (e.g., for an HR application, the names of employees or bonus structure), feature enablement flags (e.g., Enable_Feature_y), framework specific flags (e.g., Java JDK parameters such as "GC strategy," "memory allocation," and "PHP memory_limit"). In some embodiments, the user 104 may also provide additional executables, additional configuration files, search and replace commands, file copy instructions, and/or file move instructions as a part of operation 216. These additional inputs may be used to influence the creation of the container configurations 120 during the below container creation 230 process.

In the example embodiment, the container configuration module 110 then creates 232 a container configuration 120 for the application 130. More specifically, the container configuration module 110 utilizes the dependency models retrieved from the model database 204, the received 222 environment variables, the source elements provided 214 by the source control system 134, and the additional target elements identified from the received 214 source elements 132 to create 232 one or more container configurations 120 for the source application. Further details with regard to container creation 232 are described in greater detail below with respect to FIG. 3.

The container configuration module 110 may execute or build (e.g., as a part of operation 232) one or more running containers from the container configuration(s) 120 and, subsequently, generate (not separately shown) an image of the running container(s) after the build. As such, these images may also be stored and/or used as container configurations 120. In some embodiments, the container configuration module 110 may build and store container images instead of, or in addition to, creating a dockerfile.

In some scenarios (e.g., for some applications 130), multiple containers may be built for the source application 130. As such, multiple container configurations 120 may be built for the source application 130. In the example embodiment, the container configuration module 110 loops 230 through container creation operations 232 and 236 for each container configuration 120 required by the source application 130. In other words, the container configuration module 110 may create, for the source application 130, multiple container configurations 120, sometimes referred to herein as a cluster of containers. For example, the source application 130 may include dependencies for a database application and an http server application. These dependencies may be included within a single container configuration 120. In other embodiments, the database application and/or the http server application may each generate their own container configurations 120. As such, loop 230 may entail creating multiple container configurations 120, for example, for a parent container configuration 120 and one or more dependency container configurations 120.

Once the container configuration(s) 120 are created 232, the container configuration module 110 networks 236 the container configuration 120. Networking 236 containers is described in further detail below with respect to FIGS. 5-8.

Once the container configuration module 110 has completed creating all container configurations 120 for the source application 130, the container configuration module 110 provides the container configurations(s) 120 for use by the user 104 and/or user device 106. In some embodiments, the container configurations(s) 120 are stored in a container database such as database 154 (shown in FIG. 1). Further, the user 104 or the container configuration module 110 may initiate execution of the container(s) 120 through the continuous deployment platform 150 (shown in FIG. 1), or through the execution environment 140 (shown in FIG. 1), or through a CaaS (not shown).

Figure 3:
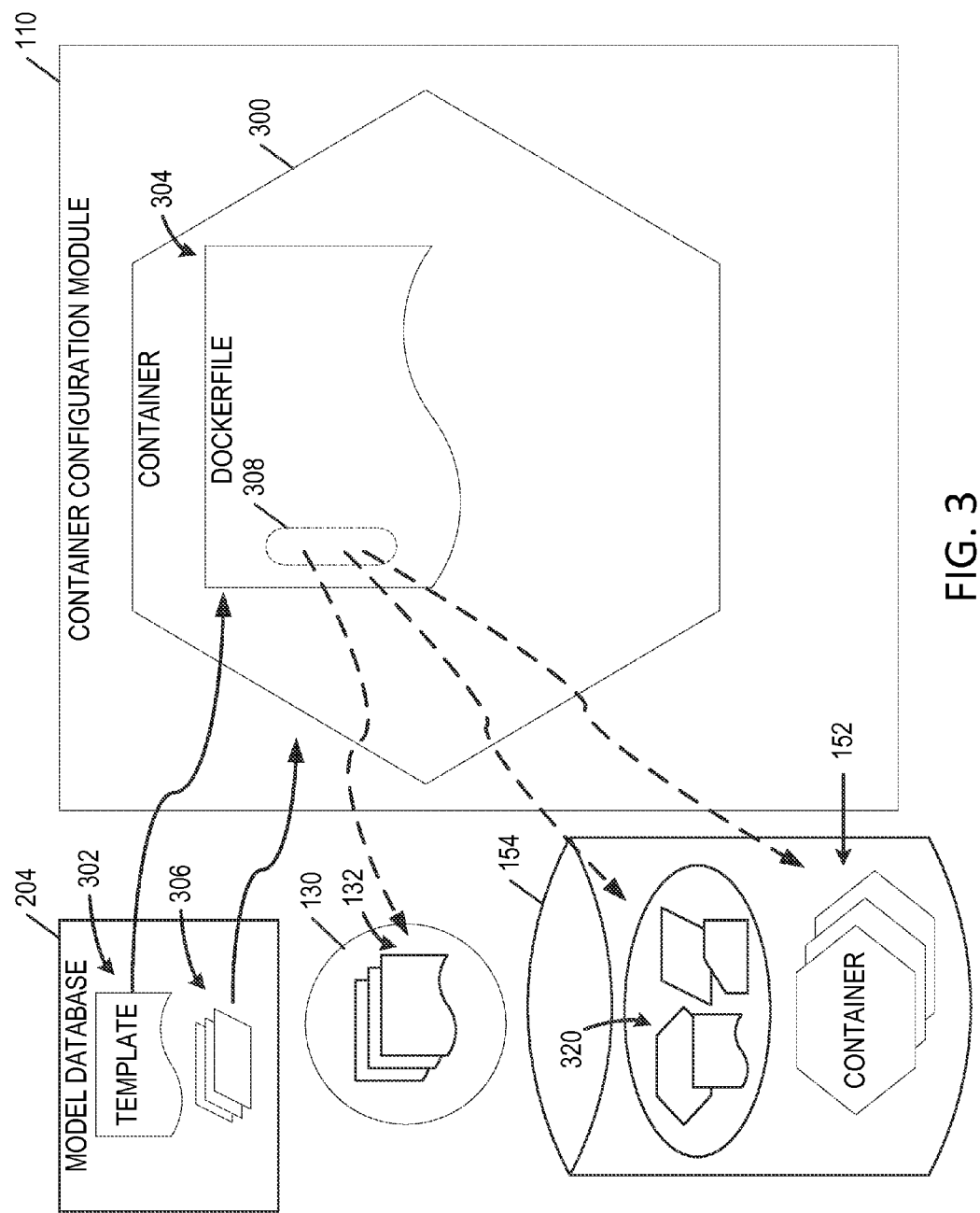
FIG. 3 is a diagram of an example dockerfile and container created by the container configuration module shown in FIG. 1 for the source application shown in FIG. 1.

FIG. 3 is a diagram of an example container configuration file 304 constructed by the container configuration module 110 for the source application 130 (e.g., from the source components 132). In the example embodiment, the container configuration file 304 is a dockerfile 304, and is constructed as a part of a container configuration 300. In some embodiments, container configuration 300 is similar to container configuration 120 (shown in FIGS. 1 and 2). In some embodiments, container configuration 300 may be a container image (e.g., built using the dockerfile 304).

During construction of the container configuration 300, the container configuration module 110 identifies a container configuration file template 302 from the model database 204. The template 302 is used to construct the dockerfile 304, and includes multiple pre-configured container build operations that may be suitable for the source application 130. In some embodiments, the template 302 is chosen from multiple templates 302 based at least in part on the nature of the source application 130.

The container configuration module 110 modifies or edits the dockerfile 304 based on inspection of the source elements 132. In other words, dockerfile 304 begins as a copy of template 302, and is then modified to tailor the container configuration 300 to run the source application 130. More specifically, the container configuration module 110 identifies one or more dependency models 304 from the model database 204, as described above in reference to FIG. 2. The dockerfile 304 is configured to include and/or refer to a variety of data elements associated with the application 130.

In the syntax and functionality as defined and supported by Docker, dockerfile syntax offers several commands or other references to various types of container components or container references. For example, dockerfile syntax offers "ADD" and/or "COPY" for copying new files, directories, or other data to into the container (e.g., copying an application component into a filesystem local to the container), "RUN" for executing a command-line command within the container (e.g., to execute an installation of the application component), "ENV" for setting environment variables within the container, and so forth. These and other commands may be used to construct or configure the dockerfile 304 to run the source application 130 and, for example, to add dependent application components detected by inspection of source elements 132.

The source application 130 references one or more dependency components, as described above. During the construction of dockerfile 304, one or more references 308 are added into or edited within the dockerfile 304 to reference 308 dependency components. In FIG. 3, broken lines originating from dockerfile 304 represent references 308 to dependency components required to run the application 130. Dependency components may include source elements 132 (e.g., source code files, configuration files, etc.), one or more pre-packaged dependency components 320 (e.g., a particular version of database, or a particular language compiler or interpreter), and/or one or more pre-built containers 152 (e.g., an operating system image). For example, dockerfile 304 may include a reference 308 to a base image 152 for the UBUNTU® operating system stored in database 154 (e.g., with a line "FROM UBUNTU"), and may also refer to a source code file provided as a source element 132 (e.g., a perl script), and may also refer to a pre-packaged dependency component 320 identified as a dependency from inspection of the source elements 132 (e.g., a perl interpreter package compiled to run on the UBUNTU® operating system).

The container configuration module 110 inspects source elements 132 to determine various configurations of dockerfile 300. These various configurations may include references to (a) source elements 132 (e.g., copying source code into the container), (b) references to pre-existing containers 152 or other containers (not separately shown) assembled in conjunction with the container configuration 300 (e.g., when a cluster of containers is required to execute application 130), and (c) pre-packaged dependency components 320 identified by the container configuration module 110 as necessary for execution of application 130 (e.g., as described above).

During inspection of source elements 132, the container configuration module 110 uses one or more inspection methods to identify dependency components 310. In some embodiments, the container configuration module 110 examines file characteristics and/or file contents of a particular source element 132 to identify which configuration model 306 to use to detect dependency components from the source elements 132. For example, the container configuration module 110 may examine a file name, a filename extension (suffix), and/or a special header line (e.g., at the beginning) within the source element 132 to determine a file type that may be used to select a particular configuration model 306. Some files identify aspects of their nature (e.g., what language they are written in, or by what interpreter they should be processed) by certain conventions.

For example, a source element 132 written in Python script may have a file name of "setup.py", a filename extension of ".py", or a perl script may have a filename extension of ".prl", or the presence of "GemFile" indicating "Ruby on Rails", or "composer.json" indicating "php". For another example, the source element 132 written in perl may include a line within the file such as "#!/usr/local/bin/perl" or such. In other words, specific language or file content within a source element 132 may indicate what configuration model 306 to use for dependency component identification (e.g., filename having a ".prl" extension may result in selecting a "Perl" configuration model to use to scan the .prl file for additional dependencies), or in some embodiments, the specific language may identify a dependency component directly (e.g., filename having ".prl" extension leading directly to the inclusion of a perl package).

The container configuration module 110 performs content inspection of source elements 132 to determine dependency components 310. The types of content inspection may vary for different types of files, and for the types of dependencies searched for. For some types of files, the container configuration module 110 may infer dependencies based on certain keywords appearing within a line, or within a particular syntax/format. In some embodiments, the container configuration module 110 may determine a file type of a particular source element 132, and then may perform content inspection based on that file type. For example, a GemFile may result in the use of a "Ruby on Rails" model. In some embodiments, the configuration model provides a potential dependency component along with a set of one or more dependency indicators whose presence in the source element 132 would implicate that potential dependency component as a dependency of the source element 132 and of the source application 130. Each dependency indicator may be, for example, a text string or a value, where the presence of such a text string or value may implicate the dependency component.

For example, the "Ruby on Rails" configuration model may include multiple dependency component sections for various potential dependencies that may appear in the GemFile (e.g., a source element 132), one of which is the database management system "PostgreSQL". An excerpt of this configuration model may identify a block of string values that are "dependency indicators," whose presence in the source element 132 would thus implicate dependency on the dependency component of "PostgreSQL". The configuration model may include, for example:

"postgresql": [
"activerecord-jdbcpostgresql-adapter",
"activerecord-postgres-array",
"activerecord-postgres-copy",
"activerecord-postgres-hstore-core",
"activerecord-postgres-uuid",
"activerecord-postgresql-adapter",
"activerecord-postgresql-cursors",
"activerecord-postgresql-extensions",
"activerecoruby-postgres",
"ahamid-postgres-pr",
"dm-postgres-adapter",
"do_postgres",
"em_postgresql",
"friendly_postgres",
"jdbc-postgres",
"jeremyevans-postgres-pr",
"mv-postgresql",
"pg",
"postgres",
"postgres-copy",
"postgres-pr",
"postgres_ext",
"postgres_sequence_support",
"postgresql_cursor",
"rd-postgres-hstore",
"rdbi-driver-postgresql",
"rdo-postgres",
"ruby-pg", "sequel_postgresql_triggers",
"silent-postgres",
"swift-db-postgres",
"trinidad_postgresql_dbpool_extension"].

The first token or identifier provided in the above example is "postgresql", which identifies a potential dependency component identifier of PostgreSQL. This dependency component identifier is followed by a comma-delimited block that includes multiple dependency indicators (e.g., "activerecord-jdbcpostgresql-adapter", "activerecord-postgres-array", etc.). During inspection of the GemFile, the container configuration module 110 may search for the presence of any or all of the dependency indicators within the GemFile. For example, the detection of the string "postgresql_cursor" causes the container configuration module 110 to include PostgreSQL (i.e., the dependency component associated with the dependency indicator) within the container configuration 300 (e.g., as a reference 308 within the dockerfile 304).

For another example, a source element 132 of a file named "setup.py" may implicate a "Python" configuration model 306. The Python configuration model may include, inter alia, a block associated with the open source enterprise messaging application "RabbitMQ". For example, the Python configuration model 306 may include:

"rabbitmq": [
"Chu",
"EntityStore",
"Flask-Celery",
"Kuyruk",
"OpenREM",
"Pi-Control-Service",
"aamnotifs",
"affinitic.zamqp",
"aioamqp",
"amphora",
"amqp",
"amqp-Storm",
"amqp-dispatcher",
"amqpDeliver", "amqpQueue",
"amqp_shrapnel",
"amqp_worker", . . . ]
In other words, the "rabbitmq" block within the Python configuration model defines one or more dependency indicators that implicate RabbitMQ as a dependency component to be added to the container configuration 300.

Each of these examples represents the requirement for a dependency component 310 to be included in container configuration 300. In other words, to properly execute the source application 130 that includes, for example, a "setup.py" Python source element 132, the container configuration 300 is constructed to include or reference Python interpreter (e.g., as a pre-packaged dependency component 320).

The container configuration module 110 identifies these dependencies as "intermediate dependencies." In other words (and continuing the Python interpreter example), the container configuration module 110, at this stage, identifies the need for a Python interpreter, but may not have yet identified specifically which Python interpreter to include as a dependency component 320 within container configuration 300. For example, Python interpreters exist for a variety of different operating systems, and each Python interpreter may have various versions available, and various libraries may also be available and necessary for executing the source element 132. Accordingly, the container configuration module 110 identifies a final dependency components 320 from an intermediate dependency, for example, based on the underlying operating system version or image, or based on selected versions of other pre-defined dependency components 320, containers 152, or aspects of source elements 132.

Once the container configuration module 110 identifies the dependency components 310, the container configuration module 110 integrates the dependency components 310 into dockerfile 302. Docker defines a set of commands for performing container operations that enables, for example, the dependency components 310 to be established, installed, or otherwise included in a running container. For example, having identified Ruby on Rails as a dependency component 320, the container configuration module 110 edits the dockerfile 304 to include a reference 308 to a Ruby on Rails pre-configured dependency component 320. In some embodiments, the selected template 302 (e.g., now copied to the dockerfile 304) may include a segment for Ruby on Rails, such as:
 # Specify the version of Rails to install
 ENV RAILS_VERSION <rails-version>
 RUN gem install rails—version "$RAILS_VERSION".
As such, the container configuration module 110 may update the "ENV" environment variable line with a rails version identifier "<rails-version>" (e.g., identifying a pre-configured dependency component 320). In other embodiments, the template 302 may not have included a segment for Ruby on Rails and, having identified the dependency, the container configuration module 110 may add in the above lines at an appropriate location within the dockerfile 304 such that the <rails-version> is installed during the container build process.

The container configuration module 110 may provide one or more options for an identified dependency component 320 to the developer or executor of the source application 130 (e.g., user 104, shown in FIG. 1). For example, having identified Python as a dependency component, the container configuration module 110 may provide a recommendation, or one or more Python interpreters (e.g., different versions), for verification or alternate selection by the user 104. As such, the user 104 may be able to alter the identified dependency component 310 prior to creation of and/or execution of container configuration 300. In some embodiments, the container configuration module 110 may indicate a recommended dependency component 320, and may further provide the user 104 with an opportunity to override or change the dependency component 320 with other options (e.g., provide a default version, but with option to change to another version).

The source application 130 may be constructed within multiple containers (e.g., multiple container configurations 300). For at least some applications (e.g., dependency components), it may be advantageous to execute dependency components in their own containers. Segmenting dependency components into multiple containers may, for example, allow the benefit of independent customization of the containers, and the particular dependency components they contain. For example, the container configuration module 110 may, inter alia, detect a database dependency 320 (e.g., PostgreSQL) within the source application 130 and generate an additional container configuration (e.g., similar to container configuration 300) for PostgreSQL (e.g., independent of the rest of the source application 130). As such, the PostgreSQL container configuration 300 may be created particular to just the PostgreSQL dependency component 320. Further, the PostgreSQL container may be customized, tuned, resourced, or otherwise configured to cater to the needs and peculiarities of PostgreSQL, and independently of the configurations of other containers associated with the source application 130. In some embodiments, the container configuration module 110 may enable the user 104 to elect whether or not detected dependencies will be separated into their own containers. Further, the container configuration module 110 may provide a recommendation for segmenting particular dependencies into one or more additional containers.

Figure 4:
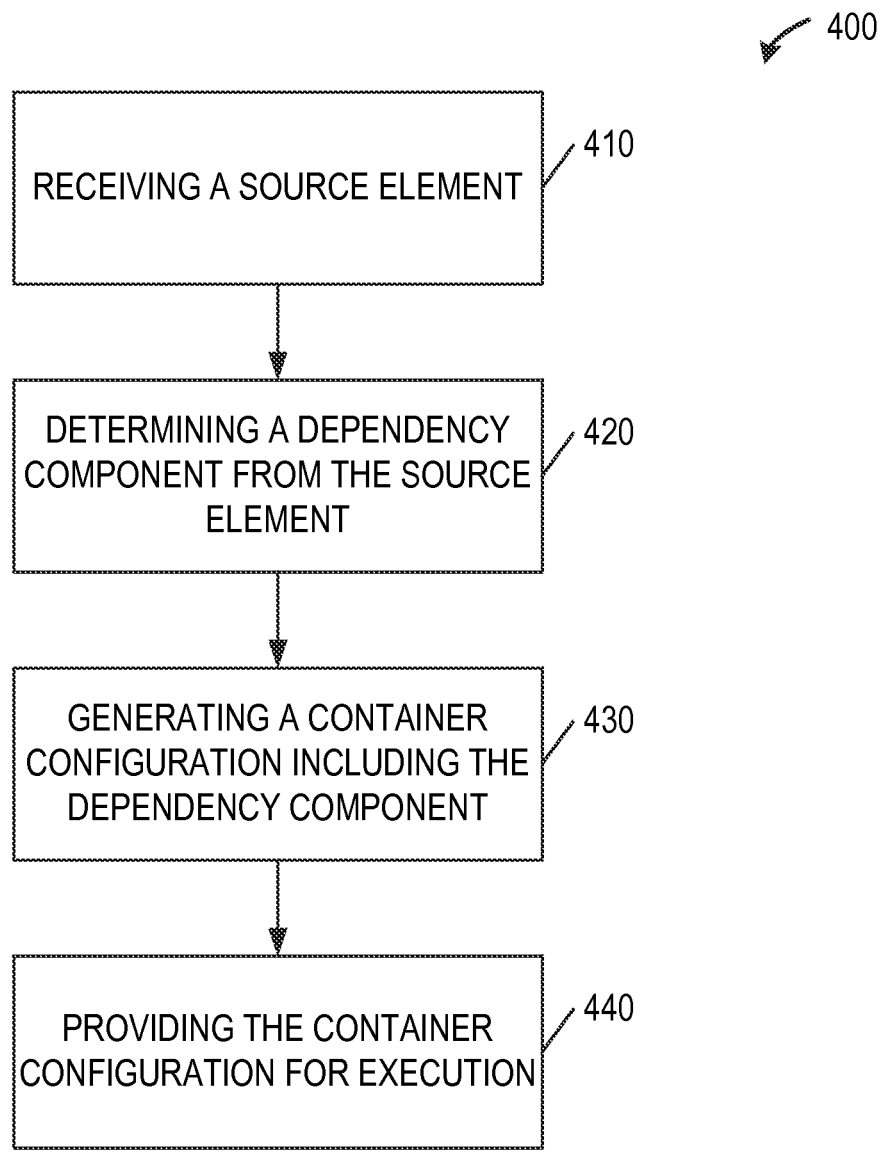
FIG. 4 is a flow chart showing an example method for automatically generating a container configuration for a source application, such as the source application shown in FIGS. 1 and 3.

FIG. 4 is a flow chart illustrating an example method 400 for automatically generating a container configuration for a source application, such as the source application 130 (shown in FIGS. 1 and 3). In the example embodiment, the method 400 is performed using at least one processor and a memory. The method 400 includes receiving 410, by the processor, a source element associated with the source application. In some embodiments, receiving 410 a source element associated with the source application further includes receiving the source element from a source control system.

The method 400 also includes determining 420, by the processor, a dependency component from the source element. In some embodiments, method 400 also includes determining a source element type of the source element, and receiving a configuration model associated with the source element type, and determining 420 a dependency component for the source element includes determining the dependency component based at least in part on the configuration model. In some embodiments, the configuration model includes a first dependency component indicator and first dependency component associated with the first dependency component indicator, and determining 420 the dependency component from the source element further includes determining the dependency component to be the first dependency component based at least in part on the identifying the dependency component indicator within the source element.

The method 400 further includes generating 430, by the processor, the container configuration including at least the dependency component. In some embodiments, generating 430 the container configuration further includes generating a dockerfile. In some embodiments, generating 430 the container configuration further includes receiving a template to use as the container configuration, and editing the container configuration to include a reference to the dependency component.

The method 400 also includes providing 440, by the processor, the container configuration for execution to an execution environment enabled to execute containers. In some embodiments, providing 440 the container configuration for execution creates a running container within the execution environment, the method further comprising generating a container image from the running container.

Figure 5:
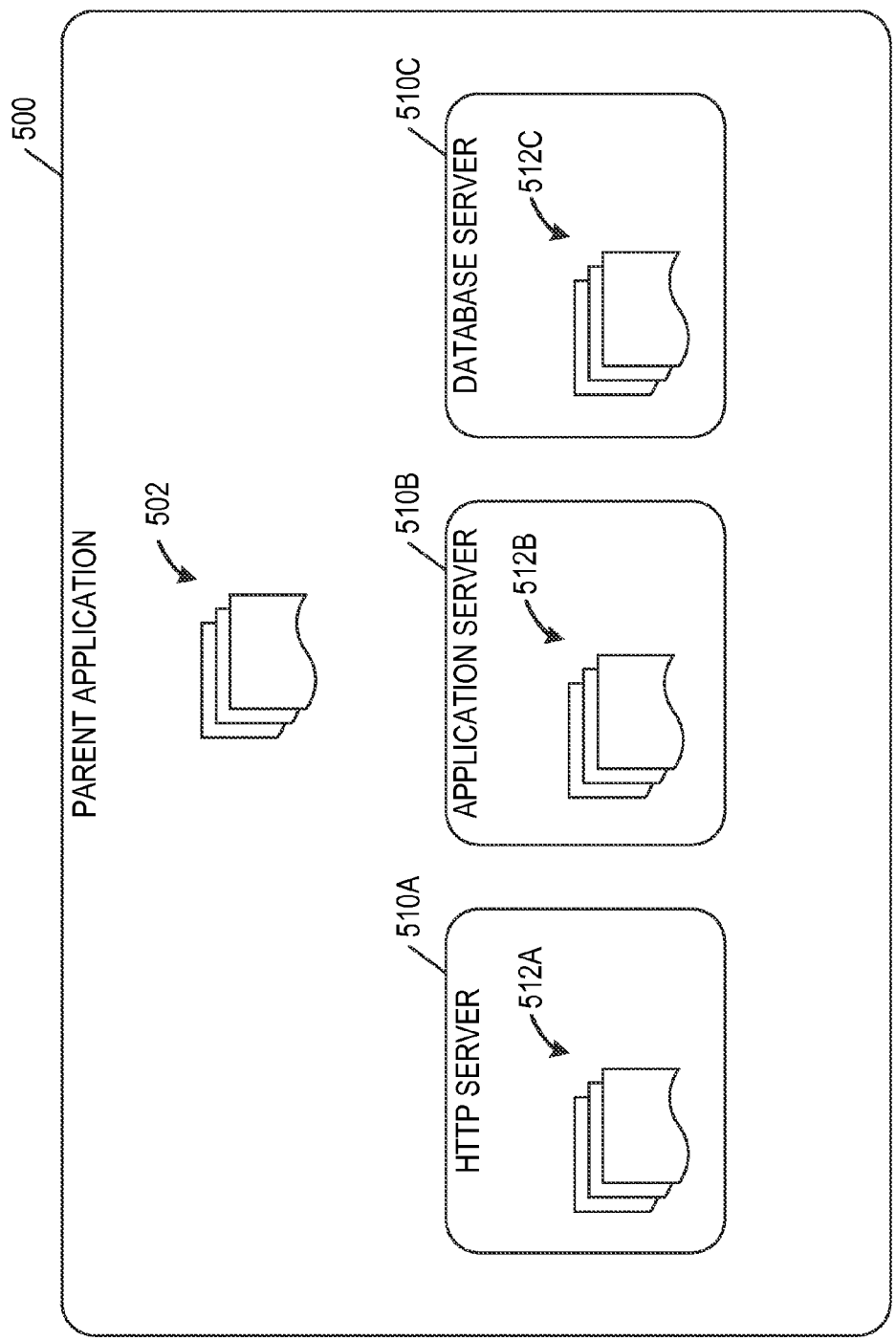
FIG. 5 is a diagram of an application that includes multiple application components or "sub-applications"

FIG. 5 is a diagram of an application 500 that includes multiple application components or "sub-applications" 510A, 510B, and 510C (collectively, "510"). The application 500 may be similar to application 130 (shown in FIGS. 1 and 3). Further, one or more sub-applications 510 may be similar to dependency components 320. As used herein, the terms "application component" and "sub-application" are used to refer to an application or set of applications that operates to at least partially perform one or more operations associated with a parent application, such as application 500. In at least some fields of application execution, multiple sub-applications 510 may operate to perform a service offered by a parent application 500.

For example, an http server 510A, an application server 510B, and a database server 510C may be considered three sub-applications of a parent application that provides a company web site having dynamic content. The sub-applications 510 may, individually, be complete applications (e.g., for performing particular functionality), but may also be considered a sub-application 510 of a parent application 500 (e.g., in a client-server model) because, for example, the parent application 500 requires the sub-applications 510 to perform at least some functionality in order for the parent application 500 to provide aspects of the parent application's overall functionality. As such, various sub-applications 510 may be included in a parent application or a "suite of applications" 500 to perform some pre-defined set of functionality (e.g., hosting of the company web site).

The parent application 500 includes one or more source elements 502. Further, each sub-application 510 may also include a set of source elements 512A, 512B, and 512C (collectively, "512"). In some embodiments, source elements 502 and/or source elements 512 may be similar to source elements 132 (shown in FIGS. 1 and 3). As described above, source elements 502, 512 may include, for example, source code files (e.g., written in a compiled or interpreted language or framework), application configuration files, environment configuration files (e.g., shell environment variables), documentation files, binaries, and/or custom libraries.

The parent application 500 may include one or more sub-applications (not separately shown) that may be represented as additional sub-applications 510 (e.g., a parent or coordinating sub-application). These other sub-applications may also communicate with sub-applications 510A-510C.

During operation (e.g., during execution of the parent application 500), sub-applications 510 and other components of the parent application 500 communicate between each other. For example, the http server 510A may communicate with the application server 510B to, for example, provide dynamic web content, and the application server 510B may communicate with the database server 510C to, for example, retrieve data that is populated into the dynamic content provided by the application server 510B. However, the relationships of communications dependencies between sub-applications of a parent application such as parent application 500 may be unknown, incomplete, or otherwise unavailable. Detection and use of these relationships between sub-applications 510 of a parent application 500 is described below in reference to FIGS. 6 and 7.

Figure 6:
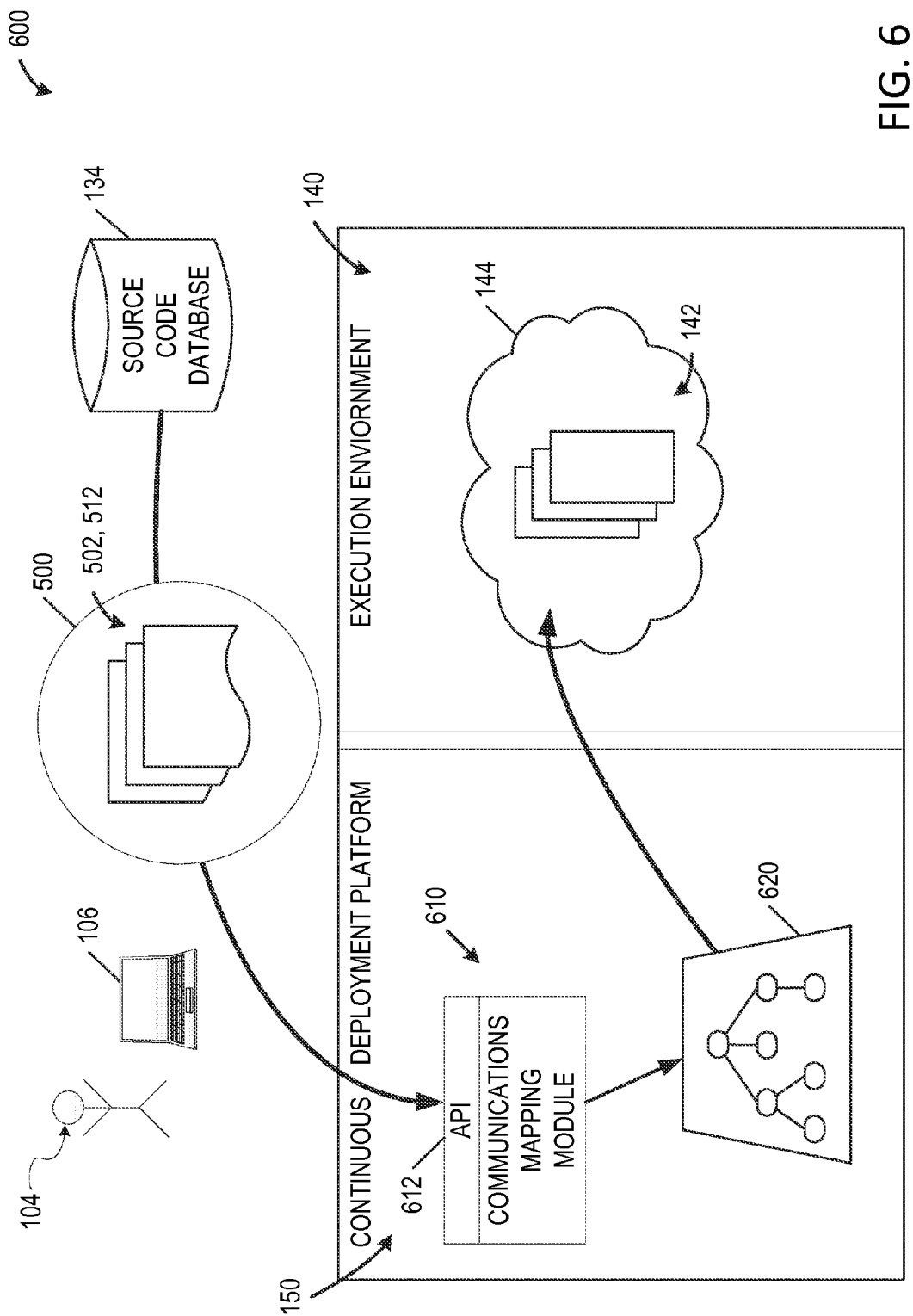
FIG. 6 is a diagram of an example networked environment in which a communications mapping module determines communication relationships, or a "relational communications graph", from source elements of the source application shown in FIG. 5.

FIG. 6 is a diagram of an example networked environment 600 in which a communications mapping module 610 determines communication relationships, or a relational communications graph (or just "graph") 620, from source elements 502, 512 of the source application 500. In the example embodiment, the communications mapping module 610 is a part of the continuous deployment platform 150 also shown and described in reference to FIG. 1.

An application developer ("user") 104 develops the source application 500 (e.g., creates, modifies, test and deploys source components 502, 512). In some embodiments, source application 500 and/or source elements 502, 512 may be similar to source application 130 and source elements 132, respectively (both shown in FIG. 1). The source application 500 includes one or more source elements 502, 512 such as, for example, source code files (e.g., written in a compiled or interpreted language or framework), application configuration files, environment configuration files (e.g., shell environment variables), documentation files, binaries, and/or custom libraries. These source elements 502, 512 include data that may be used to identify communication paths or communication relationships between application sub-components 510 (shown in FIG. 5).

Similar to as described above in reference to FIG. 1, user 104, in the example embodiment, stores source elements 502, 512 in the source code database 134. For example, the source code database may store source elements 502, 512 in a version control system such as GIT®, APACHE SUBVERSION®, mercurial, or a source control management system as a service, such as GITHUB®. The user 104 and/or the source code database 134 provide the application 500 (e.g., source elements 502, 512) to the communications mapping module 610 through an application program interface ("API") 612. In other embodiments, the user 104 may provide source elements 502, 512 directly (e.g., via direct upload, or via storage local to the continuous deployment platform 150).

During operation, the communications mapping module 610 inspects source elements 502, 512 and generates the relational communications graph 620 for the source application 500 (e.g., between the sub-applications 510) and, more specifically, from the source elements 502, 512 of the application 500. In the example embodiment, the communications mapping module 610 inspects each of the source elements 502 for the parent application 500, as well as each of the source elements 512 for each of the sub-applications 510, for references or other indications of communications with other sub-applications 510. In some embodiments, the communications mapping module 610 starts with the parent application's source elements 502 and identifies any communications references to other sub-applications within those source elements 502. Once complete, the communications mapping module 610 proceeds through each of the sub-applications (e.g., one at a time), similarly examining each of the sub-appliations' sets of source elements 512 for references or other indications of communications with other sub-applications 510.

The graph 620 includes multiple "nodes," where each node represents a particular sub-application 510. As communications references are identified, the communications mapping module 610 builds onto the graph 620 by adding linkages or connections between two nodes (sub-applications) of the graph 620. As such, each linkage represents a communications reference or a communications dependency between the two sub-applications (nodes) of the linkage. The inspection of source elements 502, 512 and the construction of the graph 620 is described in greater detail below in reference to FIG. 7.

The graph 620 may be used to "build" or execute an application and underlying components (e.g., in a container execution environment such as execution environment 140 (shown in FIGS. 1 and 6). The graph 620 enables duplication of parent applications and/or dynamically adding new servers to a running parent application. The graph 620 indicates where each needs to connect, and how to connect them correctly.

The graph 620 may be used to duplicate an application. The source application 500 may include configuration files (e.g., source elements 502, 512) that refer to "hard-coded" addresses for the other sub-applications. For example, the configuration files (e.g., source elements 512A) of the http server sub-application 510A may have a pre-configured host value for the application server 510B. As such, the graph 620 may be used to determine which other sub-applications the http server sub-application 510A communicates with (e.g., the application server sub-application 510B), and then the configuration files, environment variables, or container configurations may be altered to reflect a different host address for the application server sub-application 510B (e.g., specific to the new copy of the application 500). As such, the graph 620 facilitates duplicating and executing applications or sub-applications in a different system environment.

The graph 620 may be used to create, build, execute, or duplicate only parts of an application by, for example, only duplicating, building, or executing a sub-application and that sub-application's dependencies, or by selecting a subset of sub-applications of the overall parent application to start up. For example, a list of sub-applications 510 and/or the graph 620 of application 500 may be presented to the user 104. The user may elect to spawn, for example, just the application server 510B (e.g., for testing of some application server functionality). An examination of the graph 620 may indicate that the application server 510B depends on (e.g., communicates with) the database server sub-application 510C, but does not depend upon (e.g., does not initiate communication with) the http server sub-application 510A. As such, when the user 104 selects the application server sub-application 510B for execution, the executing system (e.g., the continuous deployment platform 150, or the execution environment 140) may duplicate only parts of the application 500 required for executing the sub-application selected by the user 104. In other words, in this example, the executing system may duplicate and execute only the application server sub-application 510B and the database server 510C. As such, the graph may be used to minimize computational resources by not executing components that are unnecessary.

The graph 620 may be provided to the continuous deployment platform 150 (shown in FIGS. 1 and 6), and the continuous deployment platform 150 may perform execution operations on the parent application 500 based on the graph 620. For example, the continuous deployment platform 150 may determine an order of execution (e.g., an order of start-up) based on the graph 620. In other words, the continuous deployment platform 150 may build, or execute, a container for the database server 510C prior to building or executing a container for the application server 510B because the application server 510B has a dependency on (e.g., communicates with) the database server 510C, based on the communications dependency included in the graph 620.

In some embodiments, some of the benefits provided by the continuous deployment platform 150, the container configuration module 110, and/or the communications mapping module 610 may be to provide application portability between/across various execution environments 140, or within a particular execution environment 140. This benefit provides not only the technical benefits of portability of applications across multiple platforms, but also enhances the functioning of the computers themselves insomuch as, for example, an application can be automatically configured into containers, where each container can then be individually customized for the particular sub-application it contains. As such, sub-applications are enabled to automatically run more efficiently within their own containers tuned to their particular needs, thereby enhancing the functioning of the computer itself.

Figure 7:
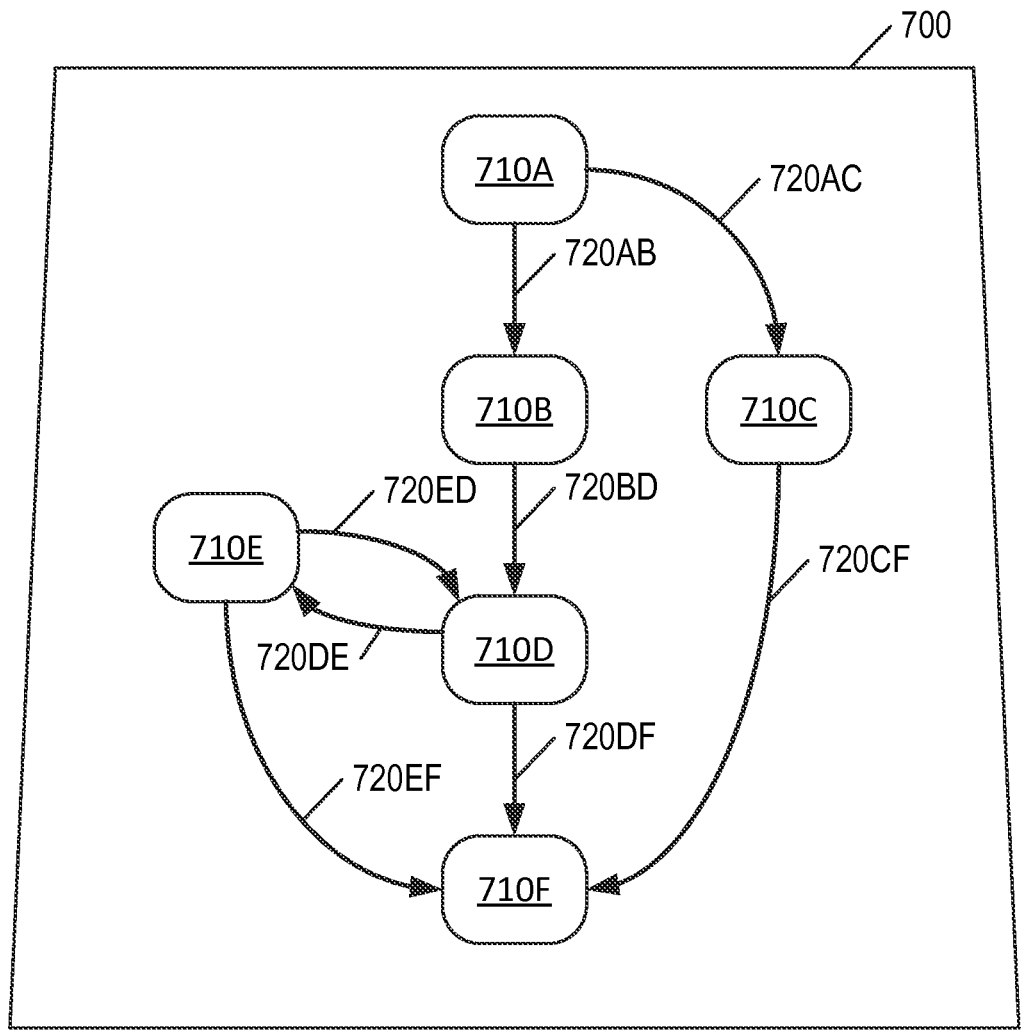
FIG. 7 is a diagram of an example relational graph showing multiple application components for a source application (not separately identified in FIG. 7)

FIG. 7 is a diagram of an example relational dependency graph 500 showing multiple application components for a source application (not separately identified in FIG. 7). In some embodiments, the source application is similar to source application 500 (shown in FIGS. 5 and 6). The source application includes multiple sub-applications 710A, 710B, 710C, 710D, 710E, and 710F (collectively, sub-applications 710). In some embodiments, sub-applications 710 may be similar to sub-applications 510 (shown in FIG. 5). In the example embodiment, sub-application 710A may be a "head" or "parent" sub-application, or an application coordinator for the source application (e.g., a parent application from which all other sub-applications spawn, directly or indirectly). Further, sub-application 710B may be similar to the http server application 510A (shown in FIG. 5), sub-application 710D may be similar to the application server 510B (shown in FIG. 5), and sub-application 710F may be similar to the database server 510C (shown in FIG. 5).

The graph 700 is a communication graph generated by the communications mapping module 610 (shown in FIG. 6). As is common in the field of graph theory, graph 700 includes multiple nodes or vertices (represented by the rounded rectangles of sub-applications 710A-710F), and multiple edges 720AC, 720AB, 720CF, 720BD, 720DF, 720ED, 720DE, 720EF, and 720DF (collectively, edges 720). Each edge 720 connects two nodes 710. In the example embodiment, edges 720 are "directed edges", or edges indicating a coupling of two nodes in a particular direction, and, as such, are illustrated in FIG. 7 as arrowed lines. In other embodiments, edges 720 may be undirected.

Each edge 720 has a tail node (e.g., the node form which the edge starts) and a head node (i.e., the node to which the edge points). For example, edge 720AC has node 710A as the tail node and node 710C as the head node. Edges 720, in the example embodiment, represent a communications dependency between the two nodes. More specifically, edges 720 represent a communications dependency of the tail node of the edge on the head node of the edge. For example, node 710A (e.g., sub-application 710A) has a communications dependency on node 710C (e.g., sub-application 710C), as indicated by directed edge 720AC. In other words, sub-application 710A depends upon (e.g., initiates communication with, or uses the services of) sub-application 710C (as indicated by edge 720AC), but sub-application 710C does not depend upon sub-application 710A (because of the lack of a directed edge from node 710C to 710A).

In the example embodiment, each sub-application 710 includes a set of source elements (not shown), which may be similar to source elements 502, 512 (shown in FIG. 5). Further, in some embodiments, each sub-application 710 may be embedded within a container such as container configurations 120, 300 (shown in FIGS. 1-3). During operation, the communications mapping module 610 creates graph 600. More specifically, the communications mapping module 610 generates nodes 710 for each sub-application of the source application, and then examines the source elements of each sub-application 710 to determine the communications dependencies (e.g., how to build edges 720 between nodes 710).

While investigating a given set of source elements for a sub-application (e.g., sub-application 710A), the communications mapping module 610 inspects each source element for indicators of communications dependencies with other sub-applications (e.g., an indication that sub-application 710A communicates with sub-application 710C). When, for example, the communications mapping module 610 detects that sub-application 710A has a communications dependency with sub-application 710C, the communications mapping module 610 then builds an edge (e.g., edge 710AC) directed from the dependent node (e.g., node 710A, as the tail node) to the referenced node (e.g., node 710C, as the head node).

To determine which edges 720 to add to graph 700, as mentioned above, the communications mapping module 610 inspects source elements of each sub-application 710 to determine communication dependencies. In some embodiments, the communications mapping module 610 inspects configurations files for uniform resource indicators ("URLs"). If a URL is identified within the source element of, for example, http server sub-application 710B which references the application server 710D, the communications mapping module 610 adds a dependency from node 710B to node 710D in graph 700. Some example environment variables that provide URLs indicating communications dependencies include, for example:

FULL_API_DOMAIN=http://forrest-api-codenow.runnableapp.com
    GITHUB_CALLBACK_URL=http://forrest-api-codenow.runnableapp.com/auth/github/callback
    GITHUB_HOOK_URL=http://forrest-api-codenow.runnableapp.com/actions/github
    DOMAIN=runnable3.net
    REDIS_NAMESPACE="runnable:ryan-api"
    ENABLE_BUILDS_ON_GIT_PUSH=false It should be understood that a communications dependency, for example as indicated by edge 720AC, indicates at least that the tail node (e.g., 710A) depends upon communications with the head node (e.g., 710C), but does not preclude communications back to the tail node. In other words, nodes 710A and 710C may communicate back and forth during the execution of the source application. The absence of another edge directed from node 710C to 710A merely indicates that application 710C does not have a communications dependency on 710A (or has a dependency that remains undetected by the communications mapping module 610).

Further, it should be understood that any method of internally representing graph 700 (e.g., within computer memory) that enables the systems and methods described herein may be used.

Figure 8:
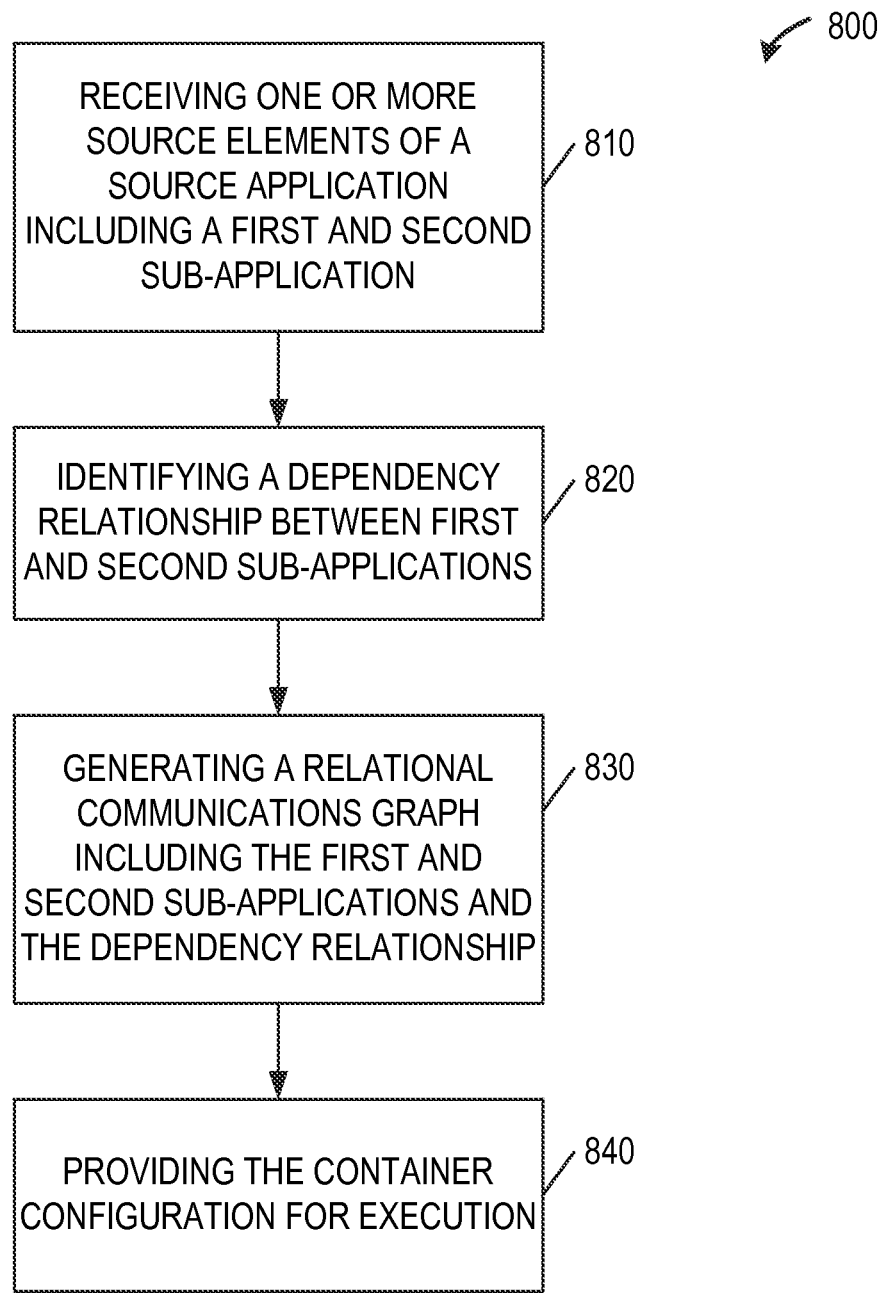
FIG. 8 is a flow chart showing an example method for generating a relational communications graph for a source application, such as the source application shown in FIGS. 5 and 6.

FIG. 8 is an example method 800 for generating a relational communications graph for a source application, such as the source application 500 (shown in FIGS. 5 and 6). In the example embodiment, the method 800 is performed using at least one processor and a memory. The method 800 includes receiving 810 one or more source elements associated with the source application, the source application including a first sub-application and a second sub-application.

In the example embodiment, the method 800 also includes identifying 820 a dependency relationship between the first sub-application and the second sub-application based at least in part on an inspection of the one or more source elements. In some embodiments, identifying 820 a dependency relationship between the first sub-application and the second sub-application further includes identifying a dependency relationship based at least in part on an indicator of communications between the first sub-application and the second sub-application within the one or more source elements. Further, in some embodiments, the indicator of communications within the one or more source elements is a uniform resource indicator (URL). In some embodiments, the first sub-application is included within a first container, the one or more source elements includes a first container configuration associated with the first container, and identifying 820 a dependency relationship between the first sub-application and the second sub-application further includes identifying the dependency relationship from an inspection of the container configuration.

The method 800 further includes generating 830 the relational communications graph including the first sub-application, the second sub-application, and the dependency relationship. The method 800 also includes providing 840 the relational communications graph for use in executing the source application in an execution environment. In some embodiments, providing 840 the relational communications graph for use in executing the source application further includes providing the relational communications graph to a user through a display interface, receiving a first selection of the first sub-application from the user, the first selecting representing desire of the user to execute the first sub-application, marking the first sub-application for execution based on the first selection, and automatically marking the second sub-application for execution based at least in part on the dependency relationship between the first sub-application and the second sub-application. In some embodiments, providing 840 the relational communications graph for use in executing the source application further includes identifying an order of execution of the first sub-application relative to the second sub-application based at least in part on the dependency relationship between the first sub-application and the second sub-application. In some embodiments, the method 800 further includes altering a first source element of plurality of source elements based at least in part on the dependency relationship between the first sub-application and the second sub-application.

Figure 9:
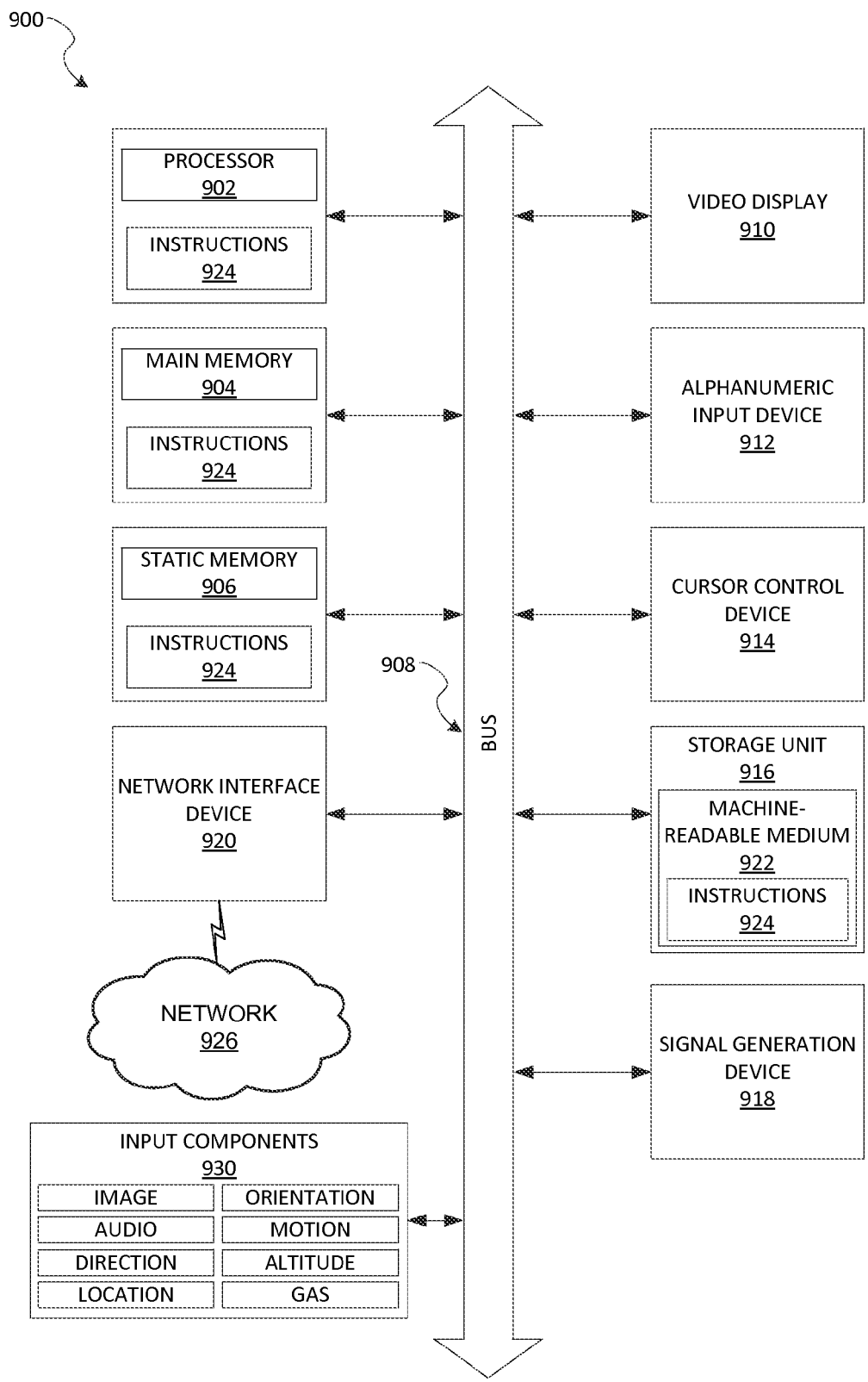
FIG. 9 is a diagrammatic representation of a machine in the example form of a computer system within which a set of instructions, for causing the machine to perform any one or more of the methodologies discussed herein, may be executed.

FIG. 9 is a diagrammatic representation of a machine in the example form of a computer system 900 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g., a keyboard), a user interface (UI) navigation device 914 (e.g., a cursor control device), a disk drive unit 916, a signal generation device 918 (e.g., a speaker) and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, with the main memory 904 and the processor 902 also constituting machine-readable media.

The software 924 may further be transmitted or received over a network 926 via the network interface device 920 utilizing any one of a number of well-known transfer protocols (e.g., Hyper Text Transfer Protocol (HTTP)).

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The invention claimed is:

1. A container configuration system comprising:
at least one processor executing an operating system supporting operating-system-level virtualization using containers; and
a memory,
the at least one processor configured to collectively perform operations comprising:
receive a source application in the memory, the source application including a source element;
determine a dependency component from the source element;
based on the determining, generate a container configuration including at least the dependency component; and
execute the container configuration by the operating system, execution of the container configuration causing the operating system to load the dependency component within a container running under the operating system, thereby isolating the container and the dependency component from other applications running under the operating system not a part of the container.

2. The container configuration system of claim 1, wherein the at least one processor is further configured to:
determine a source element type of the source element; and
receive a configuration model associated with the source element type,
wherein determining a dependency component for the source element includes determining the dependency component based at least in part on the configuration model.

3. The container configuration system of claim 2, wherein the configuration model includes a first dependency component indicator and first dependency component associated with the first dependency component indicator, wherein determining the dependency component from the source element further includes determining the dependency component to be the first dependency component based at least in part on the identifying the dependency component indicator within the source element.

4. The container configuration system of claim 1, wherein generating the container configuration further includes generating a dockerfile.

5. The container configuration system of claim 1, wherein generating the container configuration further includes:
receiving a template to use as the container configuration; and
editing the container configuration to include a reference to the dependency component.

6. The container configuration system of claim 1, wherein providing the container configuration for execution creates a running container within the execution environment, wherein the at least one processor is further configured to generate a container image from the running container.

7. The container configuration system of claim 1, wherein receiving a source element associated with the source application further includes receiving the source element from a source control system.

8. A computer-implemented method performed using at least one processor and a memory, the method comprising:
receiving a source application in the memory, the source application including a source element;
determining a dependency component from the source element;
based on the determining, generating a container configuration including at least the dependency component; and
executing the container configuration by an operating system supporting operating-system-level virtualization using containers, execution of the container configuration causing the operating system to load the dependency component within a container running under the operating system, thereby isolating the container and the dependency component from other applications running under the operating system not a part of the container.

9. The method of claim 8 further comprising:
determining a source element type of the source element; and
receiving a configuration model associated with the source element type,
wherein determining a dependency component for the source element includes determining the dependency component based at least in part on the configuration model.

10. The method claim 9, wherein the configuration model includes a first dependency component indicator and first dependency component associated with the first dependency component indicator, wherein determining the dependency component from the source element further includes determining the dependency component to be the first dependency component based at least in part on the identifying the dependency component indicator within the source element.

11. The method of claim 8, wherein generating the container configuration further includes generating a dockerfile.

12. The method of claim 8, wherein generating the container configuration further includes:
receiving a template to use as the container configuration; and
editing the container configuration to include a reference to the dependency component.

13. The method of claim 8, wherein providing the container configuration for execution creates a running container within the execution environment, the method further comprising generating a container image from the running container.

14. The method of claim 8, wherein receiving a source element associated with the source application further includes receiving the source element from a source control system.

15. A non-transitory computer-readable storage device having embedded therein a set of instructions which, when executed by one or more processors of a computer, causes the computer to:
receive a source application, the source application including a source element;
determine a dependency component from the source element;
based on the determining, generate a container configuration including at least the dependency component; and
provide the container configuration for execution in an execution environment enabled to execute containers
execute the container configuration by an operating system supporting operating-system-level virtualization using containers, execution of the container configuration causing the operating system to load the dependency component within a container running under the operating system, thereby isolating the container and the dependency component from other applications running under the operating system not a part of the container.

16. The storage device of claim 15, wherein the set of instructions further causes the computer to:

determine a source element type of the source element; and receive a configuration model associated with the source element type, wherein determining a dependency component for the source element includes determining the dependency component based at least in part on the configuration model.

17. The storage device of claim 16, wherein the configuration model includes a first dependency component indicator and first dependency component associated with the first dependency component indicator, wherein determining the dependency component from the source element further includes determining the dependency component to be the first dependency component based at least in part on the identifying the dependency component indicator within the source element.

18. The storage device of claim 15, wherein generating the container configuration further includes generating a dockerfile.

19. The storage device of claim 15, wherein generating the container configuration further includes:

receiving a template to use as the container configuration; and editing the container configuration to include a reference to the dependency component.

20. The storage device of claim 15, wherein providing the container configuration for execution creates a running container within the execution environment, wherein the set of instructions further causes the computer to generate a container image from the running container.

* * * * *